Dec. 17, 1946.   J. G. IVY   2,412,888
CONTROL SYSTEM
Filed June 14, 1944   2 Sheets-Sheet 1

WITNESSES:

INVENTOR
Joe G. Ivy.
BY
ATTORNEY

Dec. 17, 1946.  J. G. IVY  2,412,888
CONTROL SYSTEM
Filed June 14, 1944  2 Sheets-Sheet 2

WITNESSES:
Helen Gumm

INVENTOR
Joe G. Ivy.
BY
Paul E. Friedemann
ATTORNEY

Patented Dec. 17, 1946

2,412,888

UNITED STATES PATENT OFFICE 2,412,888

CONTROL SYSTEM

Joe G. Ivy, Forest Hills, Pa., assignor to Westinghouse Electric Corporation, East Pittsburgh, Pa., a corporation of Pennsylvania Application June 14, 1944, Serial No. 540,267

8 Claims. (Cl. 172—239)

My invention relates to control system of the variable voltage type and particularly to systems containing an auxiliary regulating generator for limiting the load current of a motor to be controlled, systems and generators of this kind being disclosed in my copending applications Serial No. 496,596, filed July 29, 1943, and Serial No. 532,975, filed April 27, 1944, both assigned to the assignee of the present application.

An object of my invention is to provide a control system of the type just referred to that produces not only a load limiting regulating effect, but is also distinguished by increased accuracy and speed as regards its response to changes in the control adjustment selected by the attendant, while being free of appreciable hunting even at a high rate of change of the control adjustments.

Another object of my invention, with reference to hoists, particularly mine hoists, is to provide a hoist control system in which the torque of the hoist motor and hence the stress on the ropes and other mechanical hoisting equipment are automatically limited due to control characteristics inherent in the electrical control system, and in which the hoisting speed is a function of the selected controller position regardless of the amount of load, thus reducing the degree of attention and skill for operating the hoist, for instance, when landing a cage or pulling a skip into the dumping horns.

Still another aim of my invention is to achieve the above-mentioned objects with the aid of auxiliary generators which have a minimum number of field windings and low field heating, and it is also intended to reduce undesirable transients apt to be caused by inductive couplings (transformer effects) between different magnetically linked field windings.

Having these objects in mind, and in accordance with the invention, I control the field excitation of a main generator of a variable voltage system with the aid of two interconnected auxiliary generators. One of these auxiliary generators, hereinafter called the "control generator" has a "self-excited" field winding, rated or adjusted to just sustain the armature voltage, and other field exciting means operating as described hereafter. (When referring to a "self-excited" winding in this specification, I use this term for designating a field winding which is shunt or series connected to the appertaining generator armature and hence, in contrast to a "separately excited" winding, derives its excitation from the electric energy generated in the armature of the same machine.) The other auxiliary generator, hereinafter called the "regulating generator" has a saturation characteristic so that it generates an appreciable armature voltage only when its field excitation exceeds a given finite magnitude. The regulating generator has a field winding excited in dependence upon the load current of the motor to be controlled and is provided with other field exciting means also referred to hereinafter. I further equip the system with operator-controlled circuit means which provide an adjustable "pattern voltage" and also with automatically operating circuit means which provide a "control voltage" variable in accordance with the speed or voltage of the motor to be controlled. These different circuit means are connected with each other and with the above-mentioned other field exciting means of both auxiliary generators so as to produce in each of them a component field excitation in dependence upon the differential value of the pattern and control voltages.

According to another feature of my invention, the above-mentioned differential value of pattern voltage and control voltage is formed electrically by superimposing both on a single electric circuit and impressing the resultant differential voltage on a single field winding of the two auxiliary generators, respectively.

These and other objects of my invention will be apparent from the following description of the embodiment represented in the drawings, in which.

Figure 1:
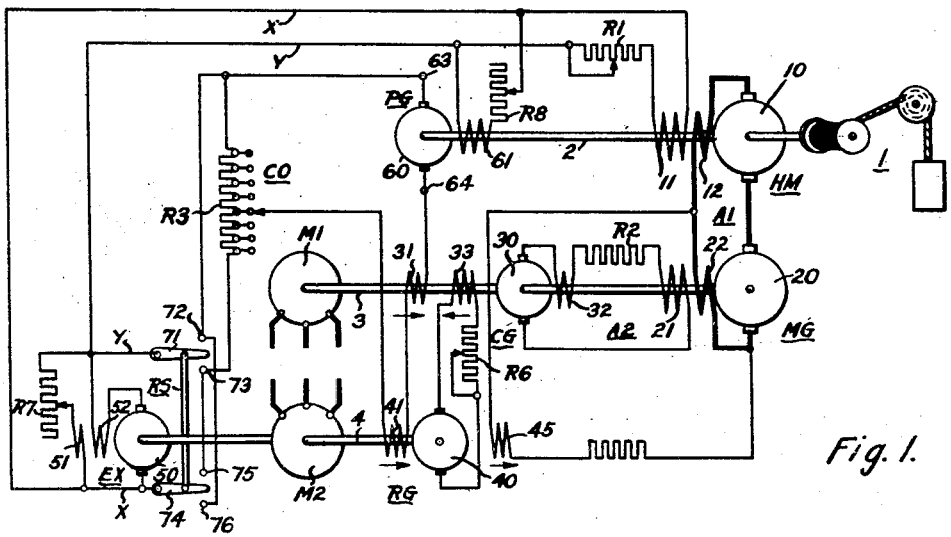
Figure 1 is the circuit diagram of a mine hoist design and operative in accordance with my invention.

Referring to the hoist control system shown in Fig. 1, the hoisting equipment proper is schematically indicated at 1 and includes a hoisting drum whose shaft 2 is mechanically connected to the armature 10 of a driving motor HM. The motor has a separately excited field winding 11 and a series-connected compensating winding 12. Winding 11 is connected through a rheostat R1 with a suitable direct current source of substantially constant voltage, here represented by an exciter generator EX having an armature 50, two field windings 51 and 52, and an adjusting rheostat R7.

The armature 10 of the hoist motor HM is connected in load circuit A1 with the armature 20 of a main generator MG which forms the current source of circuit A1. The main generator MG has a main field winding 21 connected in a control circuit A2 whose current source is formed by the armature 30 of a control generator CG. A resistor R2 is series-arranged in circuit A2. Numeral 22 denotes a compensating or interpole winding of the main generator MG.

The control generator CG has three field windings 31, 32, and 33 which cooperate in controlling the voltage impressed on the main generator field winding 21. The resultant energization of field winding 21 determines the voltage and current supplied by the main generator armature 20 through circuit A1 to the hoist motor HM, thereby controlling the torque and speed of the hoisting equipment driven by the motor HM.

The change of current in circuit A2 is determined by the excitation of field winding 31, hereinafter called the "pattern field winding" of the control generator CG. Field winding 32 is self-energized and serves to amplify the control effect. While the connection of winding 32 in circuit A2 is shown as a series arrangement, a shunt winding may be used instead. Winding 33 remains substantially deenergized as long as the load current in circuit A1 remains below a given limit, but when energized by the action of a regulating generator RG to be described hereinafter, acts in opposition to field winding 31. That is, when winding 33 is excited, its ampere turns diminish the resultant field effective on the armature 30 of control generator CG. This function takes place when the load is positive, that is when HM acts as a drive and MG as a generator. The arrows shown in Fig. 1 adjacent to windings 31 and 33, respectively, to indicate the directional relationship of the fields induced by these windings refer to the just-mentioned operating conditions. Under overhauling load conditions, HM will act as a generator and MG as a motor. The system will then still be operative to limit current, but the field of winding 33 is then operative in the same sense as winding 31 and hence assist rather than buck the field of the latter.

The regulating generator RG has its armature 40 connected to field winding 33 of control generator CG through a rheostat R6 whose adjustment need not be changed during the operation of the system. Generator RG has two cumulatively acting field windings 41 and 45 as indicated by the respective arrows in Fig. 1. Field winding 45, hereinafter called the "regulating field winding" is excited in accordance with the load current in the motor circuit A1 and to this end connected across the interpole and compensating winding 22 of main generator MG.

The armatures of generators MG, CG, RG, and EX are driven at substantially constant speed, for instance, as shown in Fig. 1, by means of a constant speed motor M1 driving a common shaft 3 of armatures 20 and 30, and another constant speed motor M2 driving a shaft 4 common to armatures 40 and 50.

The above-mentioned control field windings 31 and 41 of the auxiliary generators CG and RG, respectively, are both connected to a control circuit which is energized from two independently variable voltage sources. One of these sources imposes on the circuit a constant voltage whose magnitude and direction are adjustable by the operator. This voltage, hereinafter referred to as the "pattern voltage," is derived from the exciter mains X and Y through reversing switch means RS and a potentiometric control device CO whose resistor is denoted by R3.

The reversing switch RS, as illustrated, has two movable contacts 71 and 74, each cooperating with two stationary contacts 72, 73 and 75, 76 respectively. In one position of switch RS, contact 71 is in engagement with contact 72, and contact 74 with contact 75 in order to energize the hoist motor HM for operation in the hoisting direction. In its other position, the reversing switch RS connects movable contacts 71 and 74 with stationary contacts 73 and 76, respectively, for controlling the hoist motor to operate in the lowering direction. The control device CO is preferably designed like a customary master controller, while the reversing switch RS and its contacts are preferably formed by electromagnetic contactors which are controlled in accordance with the selected hoist or lower position of the master controller. Since the particular design of the operator-actuated control elements, here represented by CO and RS, is not essential for the invention proper, and as such, need not involve novelty over the known master controllers, the simplified illustration in Fig. 1 has been chosen for the sake of convenience and clarity.

The other voltage source of the control circuit of windings 31 and 41 serves to impose on this circuit a component voltage, hereinafter called the "control voltage," that varies automatically in accordance with the speed of the hoist motor HM. In the embodiment of Fig. 1, the source of this voltage consists of a pilot generator PG whose field winding 61 obtains constant excitation from exciter mains X and Y through an adjusting rheostat R8, while its armature 60 is driven by the motor shaft 2 and hence generates a voltage proportional to the armature speed.

The pattern voltage and control voltage counteract each other so that the resultant voltage impressed on the control field windings 31 and 41, or the voltage drop across either, corresponds to the differential value of these two component voltages. Consequently, when the speed of the hoist motor HM corresponds exactly to the setting of the master controller, the electrically established voltage differential is zero so that both field windings 31 and 41 are deenergized. When the motor speed departs from the value set by the motor controller, a positive or negative differential voltage appears and causes the field winding 31 of control generator CG to change the field excitation of the main generator MG in the direction required for correcting the discrepancy. This speed regulating effect is extremely sensitive due to the action of the self-energized field winding 32 which feeds a small portion of the control generator output power back into the control generator as excitation to produce still more output. The self-excited field is just sufficient to sustain the generated voltage. Hence, the action of the control generator is always under the control of one or more of the separately excited field windings 31 and 33. Stating this another way, the resistance of the external control circuit A2 is adjusted relative to the self-excited field excitation so that the machine CG operates near, or preferably on, its air gap line.

Figure 2:
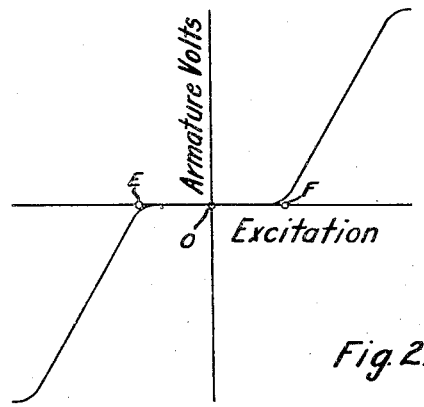
Figs. 2 and 3 are explanatory diagrams relating to the same system.

As stated above, the field winding 33 is deenergized under normal load conditions but modifies the voltage of circuit A2, thus producing a limiting effect on the load current in circuit A1, when this current tends to exceed a safe limit. In order to accomplish this action, the regulating generator RG is given a special characteristic similar to that shown in Fig. 2. This characteristic differs from that of conventional machines by having an extended low voltage or zero voltage interval between points E and F which are both displaced from the zero point 0 by fixed amounts of excitation.

Figure 4:
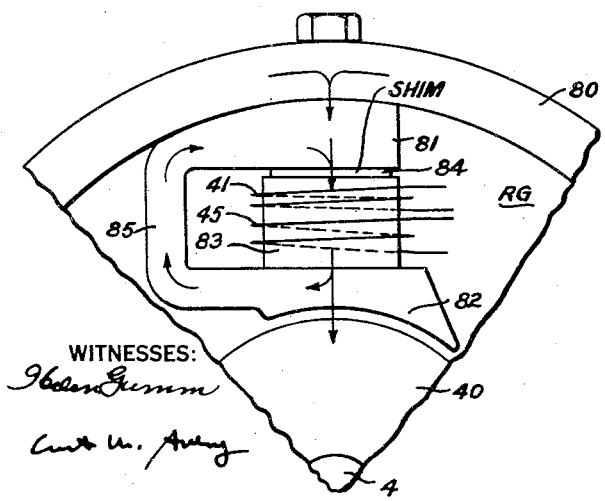
Fig. 4 is a partial view of a regulating generator used in the system of Fig. 1, the figure representing one of the pole structures of this generator.

A characteristic of this type can be obtained by providing the field poles of the generator with a saturable magnetic shunt as exemplified by Fig. 4.

In Fig. 4, numerals 4, 40, and 80 denote the shaft, armature, and stator frame, respectively, of the regulating generator. The pole structure comprises a base portion 81 in good magnetic contact with the stator frame, and a pole shoe portion 82 adjacent to the armature. The main pole portion 83 is shunted by a saturable flux path 85 and contains an air gap, or a shim 84 of high magnetic reluctance, for instance of brass. The windings of the generator are arranged on the main pole portion 83.

The air gap or shim at the top of the main pole position carries both the armature exciting flux and the shunt flux, and hence does not influence the division of flux. It primarily determines the spacing F—E of the zero voltage interval as well as the slope of the characteristic beyond points F and E according to the diagram of Fig. 2. Because of this gap or shim, substantially all flux flows through the shunt, since the reluctance of this path is low, and almost no flux is forced across the air gap into the armature to generate voltage, as long as the resultant field excitation is insufficient to saturate the shunt path. The shunt 85 is so proportioned that it saturates at an excitation corresponding to points F and E of Fig. 2 and then becomes unable to carry appreciably more flux. Consequently, upon saturation of the shunt, an increasing field excitation forces flux across the air gap into the armature so that now a voltage is generated. The action, after the shunt has been saturated, is similar to that of a conventional machine.

Due to the fact that ampere turns from the regulating field winding 45 are used for saturating the magnetic shunt, the generator output voltage is controlled in response to the armature current (and hence torque) of the hoist motor HM. As a result, the above-mentioned action between the control fields and the current limiting field of the control generator CG is not effective before the magnetic shunt on the regulating generator RG is saturated, and this saturation occurs only when the load current of the hoist motor has exceeded a safe limit value. The control field winding 41 does not saturate the shunt because the pattern voltage equals, and thus balances out, the control voltage during normal steady-state operation of the hoist motor. The transient departure from zero of this control field occurring during periods of changing speed is alone insufficient to saturate the shunt although these transient field effects are operative to produce the regulatory anti-hunting action mentioned presently.

Assume, for instance, that the operator initiates a control operation by advancing the master switch toward the full speed position and that this is done so rapidly that the limiting current would be exceeded except for the action of the generator RG. When, under such conditions, the hoist motor HM approaches full speed and the voltage of the main generator MG approaches maximum, the correcting effect required of the current limit winding 33 of generator CG, in order to properly limit the current, will be less because the control voltage of the pilot generator PG will cancel a greater portion of pattern voltage and does not have to buck down as many ampere turns from winding 31 as was previously necessary due to the larger difference between pattern voltage and control voltage. The field winding 41 of generator RG is now effective to produce this desired adjustment in excitation of the current limit winding 33. That is, since the just-mentioned differential value of control and pattern voltages is also effective in field winding 41, the resultant field excitation of generator RG and hence the current limiting effect of winding 33 are automatically reduced in the right amount to maintain the same armature current in hoist motor HM. It is this simultaneous occurrence, and its corrective effect, of the regulating action of the speed-dependent and operator-adjusted voltages in both generators CG and RG that decreases the tendency of hunting, and thus increases the accuracy, reliability and permissible speed of control.

The control is completely reversible by actuating the switch RS and, when reversed, will limit regeneration in the same manner as described above with respect to current limitation.

Figure 3:
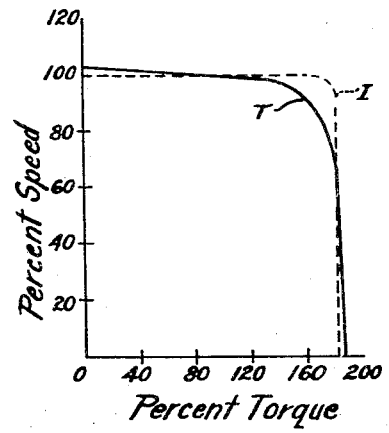

Fig. 3 shows a theoretical speed torque characteristic I of a motor controlled by such a system. Curve T represents a test curve as obtainable, for instance, by point-to-point static loading. Any transient overshooting of the current limit can be kept in the order of 10% or less even on the severe test of plugging.

The advantages of this system of control include:

1. Better performance due to a closer approach to the ideal speed torque characteristic;
2. Less maintenance, due to the elimination of contactors and excessive commutating currents in the motors and generators;
3. Increased life of the mechanical hoist parts, due to less abuse from high torque (or current) peaks;
4. Great reliability, since the control system is based on proven designs of D.-C. equipment and is substantially free from mechanically sensitive measuring or control devices apt to introduce sources of failure;
5. A small number of separate field windings in the auxiliary generators and, consequently, a low heat development in these generators and a reduced possibility of disturbances due to inductive coupling between field windings.

As explained in the foregoing, it is essential for the invention that the field excitations of the control generator CG and of the regulating generator RG are controlled in dependence upon the differential value of two component voltages, one (pattern voltage) being adjusted at will by the operator with the aid of the master controller, while the other component voltage (control voltage) varies substantially in accordance with the speed of the motor to be controlled. While in the embodiment of Fig. 1 the speed indicating voltage is produced by a pilot generator PG, there are other means available for producing a component voltage representative of the motor speed. The modification shown in Fig. 5 serves to exemplify one of these other possibilities.

Figure 5:
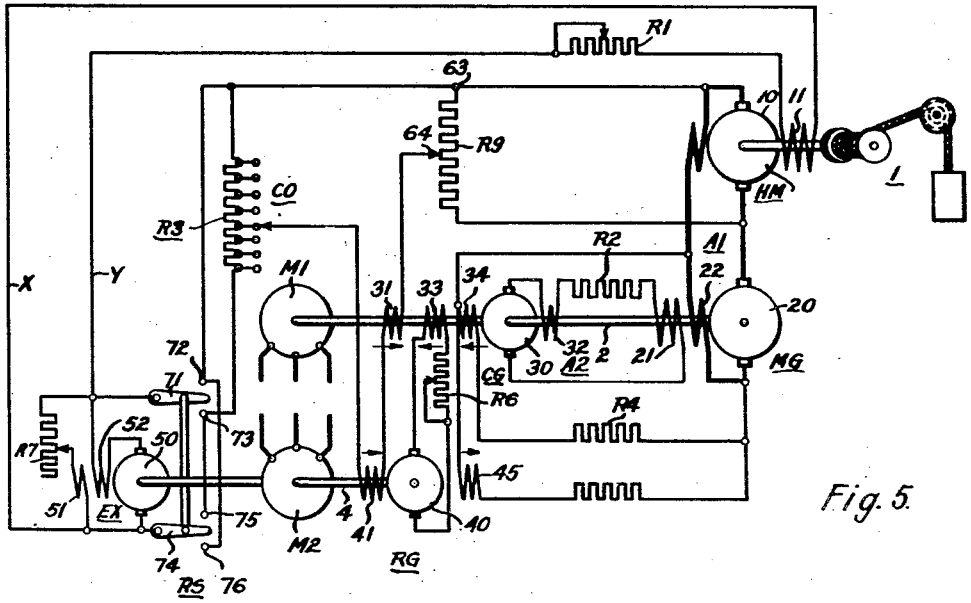
Fig. 5 is a partial circuit diagram of a second control system according to the invention.

The system represented by Fig. 5 is partially identical with that of Fig. 1 and hence illustrated only to the extent necessary to indicate its differences. The main difference lies in the fact that the speed responsive control voltage is not produced by a pilot generator but is derived by potentiometric means from the load circuit of the hoist motor HM. To this end, a potentiometer rheostat R9 is connected across the armature 10 of the hoist motor. The adjustment of this rheostat need not be changed during the operation of the hoist. The armature voltage is substantially proportional to the motor speed. Hence, the voltage drop between points 63 and 64 in Fig. 5 is substantially a measure of the motor speed. The terminal points 63 and 64 in Fig. 5 correspond to the similarly indicated points in Fig. 1, and the circuit of the master controller and of field windings 31 and 41 is otherwise exactly as shown in Fig. 1, with the exception that an additional field winding 34 is placed on the control generator CG and connected, through a resistor R4, across the main generator winding 22 in order to correct the resultant field excitation of windings 31 and 34 so that it corresponds more accurately to the speed of motor HM. The operation of the system represented by Fig. 5 is otherwise substantially the same as described above in connection with Fig. 1.

Referring once more to Fig. 1, it will be remembered that the output voltage of the regulating generator RG, under operating conditions where a current limitation in the load circuit of the motor HM is desired, causes the current limiting field winding 33 of the control generator CG to buck by its ampere turns those of the field winding 31. In other words, the regulating effect of generator RG in the system of Fig. 1 functions by imposing a subtractive magnetic effect on the field excitation of the control regulator CG. According to another feature of my invention, however, it is also possible to have the E. M. F.'s produced by the differential effect of the pattern voltage and control voltage and by the output voltage of the regulating generator, respectively, act directly upon each other so that a single field winding in generator CG may take the place of both windings 31 and 33. A modification of this type is represented in Fig. 6.

Figure 6:
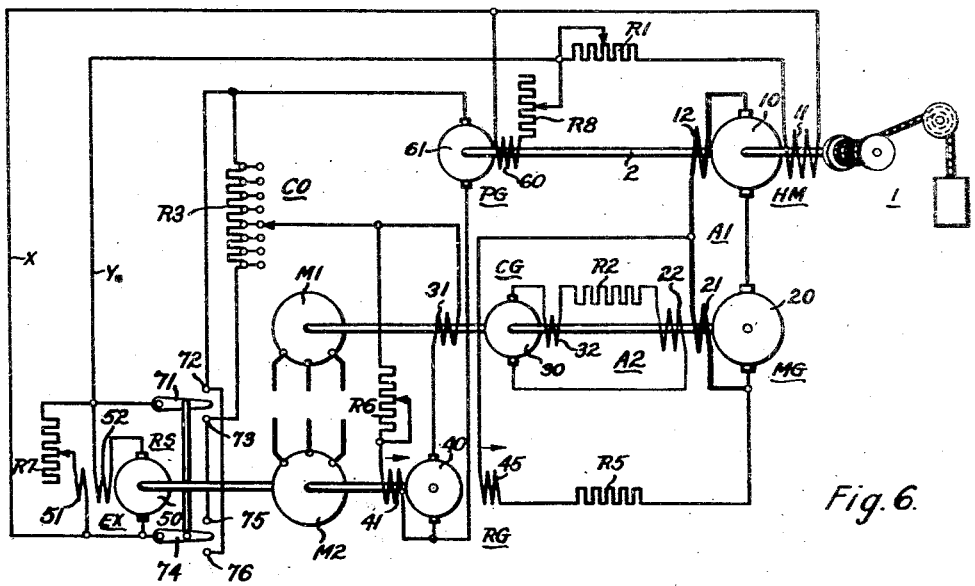
Fig. 6 is the circuit diagram of a third control system also relating to a hoist drive.

The hoist control system according to Fig. 6 is partially identical with that of Fig. 1, as is apparent from the use of the same reference characters in both figures for corresponding elements. The hoist motor HM is energized by a main generator MG and has a separately excited field winding 11 connected by an adjusting rheostat R1 to the mains X and Y of a suitable direct-current source of substantially constant voltage. The separately excited field winding 11 of the main generator MG is energized by a control generator CG which, in contrast to the system of Fig. 1, has only two field windings, one being a self-excited or feedback winding, denoted by 32, while the other winding, denoted by 31, is energized by a resultant voltage is composed as follows:

An operator-actuated master controller CO, including a reversing switch RS, serves to provide a selective pattern voltage. A pilot generator PG mounted on the shaft 2 of hoist motor HM, as in the system of Fig. 1, provides a speed responsive control voltage. A regulating generator RG having its regulating field winding 45 energized through a rheostat R5 in accordance with the load current of the hoist motor, also as described more in detail in connection with Fig. 1, produces an armature output voltage only when the load current exceeds a given maximum. The winding 41 of the regulating generator RG is connected through a calibrating rheostat R6 with the master controller and the pilot generator so that it is excited in accordance with the differential value of pattern voltage and control voltage. The pattern field winding 31 of control generator CG is also connected with the master controller and pilot generator so as to obtain likewise a component excitation in accordance with the justmentioned differential voltage value. The armature 40 of the regulating generator RG is connected between pilot generator PG and pattern field winding 31. Under normal operating conditions, the output voltage of the regulator armature 40 is negligible. Under overload conditions, however, this output voltage reduces the resultant differential voltage across winding 31, and hence reduces the excitation of the control generator CG, thus imposing thereon a current limiting effect similar to the one obtained magnetically in the system of Fig. 1. Winding 41 of generator RG, in the circuit connection according to Fig. 6, is in effect a shunt connected self-energized winding. It is preferably so rated relative to the resistance of the armature circuit of this generator that the generator operates on its air gap line.

As exemplified in the foregoing, it is possible to modify control systems according to my invention as regards several of its details without departing from its spirit and its essential features as set forth in the appended claims.

I claim as my invention:

1. A variable voltage drive comprising, a motor, a main generator having an armature circuit connected to said motor and a main generator field winding for controlling the voltage of said circuit, an amplifying control generator for energizing said main generator field winding having a current limiting field winding and a control field winding, operator-controlled circuit means for providing an adjustable pattern voltage, speed-responsive circuit means for providing a control voltage variable substantially in accordance with the speed of said motor, said operator-controlled circuit means and said speed-responsive circuit means being connected with each other and with said control field winding so as to energize said latter winding in accordance with the differential value of said pattern and control voltages, a regulating generator having saturably shunted field poles so as to generate an output voltage only when the excitation of said field poles exceeds a given value, means connecting said regulating generator with said armature circuit for providing field excitation for said regulating generator in dependence upon the load current in said armature circuit, said regulating generator being connected to said current limiting field winding so as to impress said output voltage on the latter in order to limit said load current when said load current tends to exceed a safe limit value.

2. A variable voltage drive comprising, a motor, a main generator having an armature circuit connected to said motor and a main generator field winding for controlling the voltage of said circuit, an amplifying control generator disposed for energizing said main generator field winding and having a current limiting field winding and a control field winding, a regulating generator having saturably shunted field poles so as to generate voltage only when the excitation of said field poles exceeds a given value, said regulating generator being field-controlled by said armature circuit and connected to said current limiting field winding so as to impress on the latter said voltage when the load current in said armature circuit exceeds a desired maximum value, a control field winding on said regulating generator, operator-controlled circuit means for providing an adjustable pattern voltage, circuit means for providing a control voltage variable substantially in accordance with the speed of said motor, said former and said latter circuit means being connected with each other and with said two control field windings so as to energize them simultaneously in accordance with the differential value of said pattern and control voltages.

3. A variable voltage drive comprising, a motor, a main generator having an armature circuit connected to said motor and a main generator field winding for controlling the voltage of said circuit, an amplifying control generator disposed for energizing said main generator field winding and having a current limiting field winding and a control field winding, a regulating generator having saturably shunted field poles so as to generate voltage only when the excitation of said field poles exceeds a given value, said regulating generator being field-controlled by said armature circuit and connected to said current limiting field winding so as to impress on the latter said voltage when the load current in said circuit exceeds a given maximum limit, a control field winding on said regulating generator, operator-controlled circuit means for providing an adjustable pattern voltage, and a pilot generator mechanically connected with said motor for providing a control voltage variable substantially in accordance with the motor speed, said circuit means and said pilot generator being connected with each other and with said two control field windings so as to energize them simultaneously in accordance with the differential value of said pattern and control voltages.

4. A variable voltage drive comprising, a motor, a main generator having an armature circuit connected to said motor and a main generator field winding for controlling the voltage of said circuit; an amplifying control generator disposed for energizing said main generator field winding and having a current limiting field winding and a control field winding, a regulating generator having saturably shunted field poles so as to generate voltage only when the excitation of said field poles exceeds a given value, said regulating generator being field-controlled by said armature circuit and connected to said current limiting field winding so as to impress on the latter said voltage when the load current in said circuit exceeds a desired maximum value, a control field winding on said regulating generator, operator-controlled circuit means for providing an adjustable pattern voltage, and voltage measuring circuit means connected with said armature circuit for providing a control voltage variable substantially in accordance with the motor speed, said former and said latter circuit means being connected with each other and with said two control field windings so as to energize them in accordance with the differential value of said pattern and control voltages.

5. A variable voltage drive comprising, a drive motor, a main generator having an armature circuit connected to said motor and a main generator field winding for controlling the voltage of said circuit, a control generator disposed for energizing said main generator field winding and having a self-excited voltage-sustaining field winding and separately excited field winding means, a regulating generator having saturably shunted field poles for generating abruptly increasing regulating voltage in dependence upon the passing of its field excitation through a shunt-saturating value and being provided with field winding means and having a regulating field winding connected with said circuit for providing excitation in accordance with the load current of said motor, operator-controlled circuit means for providing an adjustable pattern voltage, circuit means for providing a control voltage variable substantially in accordance with the speed of said motor, said former and said latter circuit means being connected with each other and with said field winding means of said control generator as well as with said field winding means of said regulating generator so as to energize said respective field winding means simultaneously in accordance with the differential value of said pattern and control voltages, and said field winding means of said control generator being also connected with said regulating generator so that the resultant field excitation of said control generator is modified due to said regulating voltage when said load current exceeds a desired maximum value.

6. A variable voltage drive comprising, a motor, a main generator having an armature circuit connected to said motor and a main generator field winding for controlling the voltage of said circuit, a control generator disposed for energizing said main generator field winding and having a self-excited voltage-sustaining field winding and a current limiting field winding and a control field winding, operator-controlled circuit means for providing an adjustable pattern voltage, circuit means for providing a control voltage variable substantially in accordance with the speed of said motor, said former and said latter circuit means being connected with each other and with said control field winding so as to energize it in accordance with the differential value of said pattern and control voltages, a regulating generator having saturably shunted field poles for generating abruptly increasing output voltage in dependence upon the passing of its field excitation through a shunt-saturating value and being connected with said current limiting field winding so as to impress said output voltage thereon for reducing the resultant field excitation of said control generator when the load current of said motor exceeds a desired maximum value, and circuit means connected to said armature circuit for supplying field excitation to said regulating generator in dependence upon said load current.

7. A variable voltage drive comprising, a motor, a main generator having an armature circuit connected to said motor and a main generator field winding for controlling the voltage of said circuit, an amplifying control generator disposed for energizing said main generator field winding and having a self-excited voltage-sustaining field winding and a current limiting field winding and a control field winding, a regulating generator having saturably shunted field poles for generating abruptly increasing output voltage in dependence upon the passing of its field excitation through a shunt-saturating value and being connected with said current limiting field winding, said regulating generator having a control field winding and a regulating field winding, operator-controlled circuit means for providing an adjustable pattern voltage, circuit means for providing a control voltage variable substantially in accordance with the speed of said motor, said former and said latter circuit means being connected with each other and with said two control field windings so as to energize them in accordance with the differential value of said pattern and control voltages, circuit means connected with said regulating winding for energizing it in dependence upon the load current of said motor so that said current limiting winding is energized only when said load current exceeds a predetermined maximum limit, and said current limiting field winding being arranged to act in opposition to said control field winding of said control generator so that said output voltage causes said current limiting field winding to reduce the resultant field excitation of said control generator.

8. A variable voltage drive comprising, a drive motor, a main generator having an armature circuit connected to said motor and a main generator field winding for controlling the voltage of said circuit, a control generator for energizing said main generator field winding having field winding means, a regulating generator having saturably shunted field poles for generating abruptly increasing regulating voltage in dependence upon the passing of its field excitation through a shunt-saturating value and being provided with field winding means and having a regulating field winding connected with said circuit for providing excitation in accordance with the load current of said motor, operator-controlled circuit means for providing an adjustable pattern voltage and circuit means for providing a control voltage variable substantially in accordance with the speed of said motor, said former and said latter circuit means being connected with each other and with said field winding means of said control generator as well as with said field winding means of said regulating generator so as to energize said respective field winding means simultaneously by a resultant voltage corresponding to the differential value of said pattern and control voltages, and said field winding means of said control generator being also connected with said regulating generator so that the resultant field excitation of said control generator is reduced due to said regulating voltage when said load current exceeds a given maximum value.

JOE G. IVY.